United States Patent [19]

Tingle

[11] Patent Number: 4,918,925
[45] Date of Patent: Apr. 24, 1990

[54] LAMINAR FLOW FUEL DISTRIBUTION SYSTEM

[75] Inventor: Walter J. Tingle, Danvers, Mass.

[73] Assignee: General Electric Company, Lynn, Mass.

[21] Appl. No.: 253,525

[22] Filed: Oct. 5, 1988

Related U.S. Application Data

[63] Continuation-in-part of Ser. No. 102,976, Sep. 30, 1987, abandoned.

[51] Int. Cl.⁵ ............................................. F02C 7/22
[52] U.S. Cl. ................................... 60/739; 60/746
[58] Field of Search ................ 60/739, 741, 746, 261, 60/740, 743

[56] References Cited

U.S. PATENT DOCUMENTS

| | | |
|---|---|---|
| 2,676,461 | 4/1954 | Gove . |
| 2,806,354 | 9/1957 | Cook .................................. 60/39.36 |
| 2,828,609 | 4/1958 | Ogilvie . |
| 3,750,396 | 8/1973 | Tucker . |
| 3,774,851 | 11/1973 | Simmons ............................. 239/551 |
| 3,775,975 | 12/1973 | Stenger et al. ...................... 60/39.32 |
| 3,945,402 | 3/1976 | Murphy ................................. 138/37 |
| 3,949,775 | 4/1976 | Cornell ................................. 137/118 |
| 3,995,660 | 12/1976 | Kast ................................. 137/625.48 |
| 4,402,184 | 9/1983 | Faulkner et al. ....................... 60/739 |
| 4,688,390 | 8/1987 | Sawyer .................................. 62/160 |

FOREIGN PATENT DOCUMENTS

| | | |
|---|---|---|
| 0055400 | 6/1982 | European Pat. Off. . |
| 0097312 | 1/1984 | European Pat. Off. . |
| 1024289 | 7/1958 | Fed. Rep. of Germany . |
| 316513 | 11/1956 | Switzerland . |
| 735709 | 8/1955 | United Kingdom . |

*Primary Examiner*—Donald E. Stout
*Attorney, Agent, or Firm*—Francis L. Conte; Jerome C. Squillaro

[57] ABSTRACT

Laminar flow tubes of uniform inner diameter and length are individually incorporated in each of plural fuel lines leading from a distributor to the various fuel injectors in a gas turbine combustor to provide generally uniform fuel distribution over a wide range of fuel flow rates, thus eliminating the need for a variable fuel metering valve in each fuel line.

22 Claims, 2 Drawing Sheets

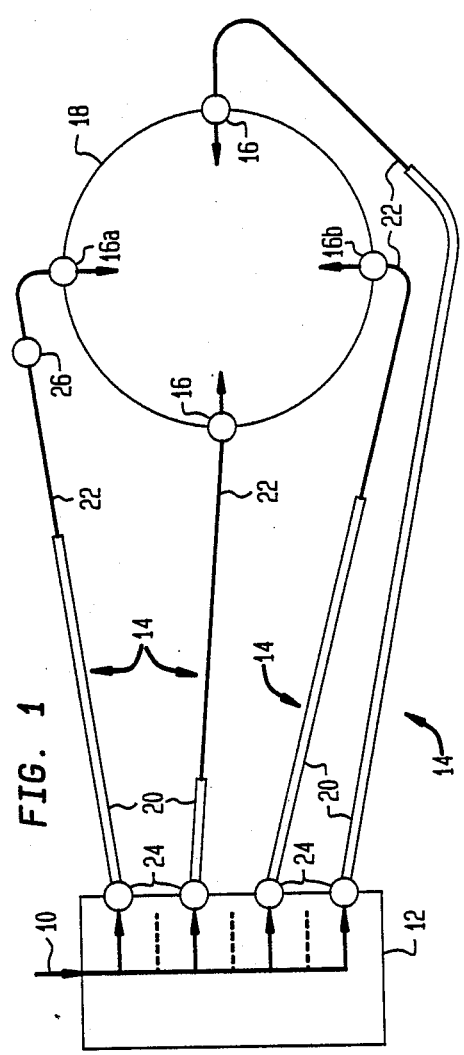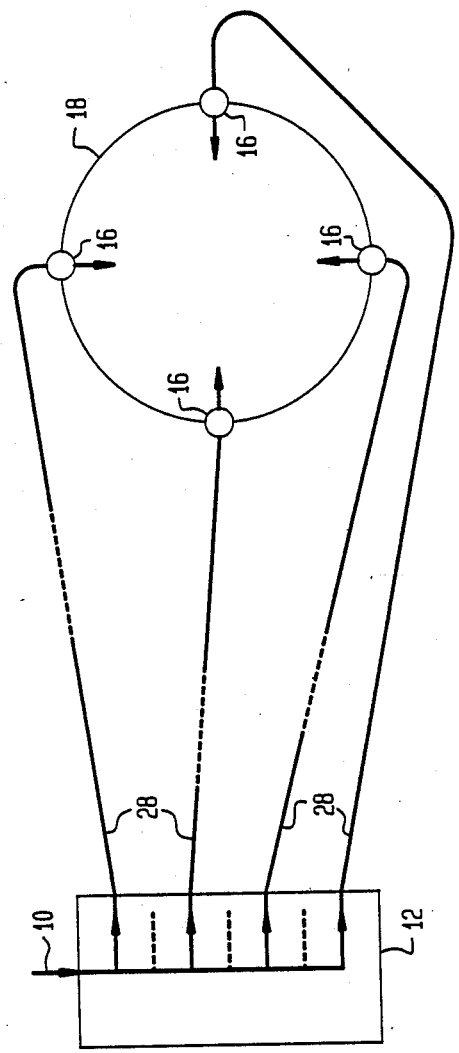

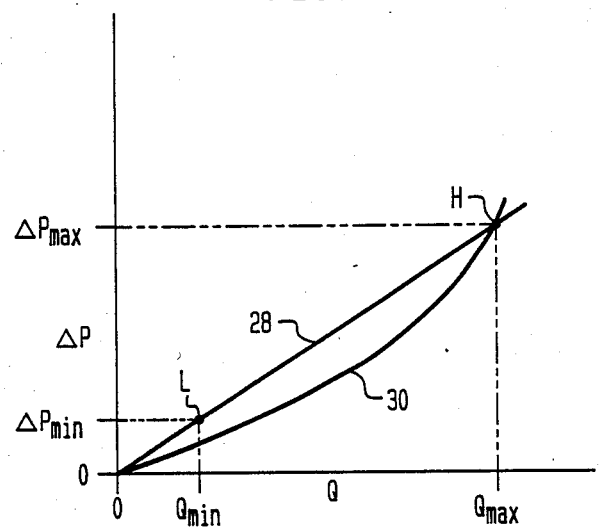

LAMINAR FLOW FUEL DISTRIBUTION SYSTEM

The United States Government has rights in this invention in accordance with contract number DAAE07-84-C-R083 awarded by the Department of the Army.

This is a continuation-in-part of application Ser. No. 102,976, filed on 30 Sept. 1987, now abandoned.

BACKGROUND OF THE INVENTION

The present invention relates to fuel distribution systems for gas turbine engines.

Fuel distribution systems for gas turbine engines are called upon to distribute fuel from a common distributor or manifold to a plurality of fuel injectors or nozzles positioned at various locations in the engine combustor. The fuel distribution must be effected over a wide range of engine operating conditions from light-off to maximum power, which represents a considerable variation in fuel flow rates.

Furthermore, the fuel must be distributed as uniformly as practical to the fuel injectors so that generally uniform combustion occurs in the combustor without obtaining undesirable temperature differentials therein. The required degree of uniformity of flow distribution depends on particular engine designs and conventional evaluation factors. For example, individual injector flow rates deviating up to about twenty percent from the average flow rate of the plurality of injectors are considered acceptably or generally uniform for practical utilization.

In a typical engine configuration, the fuel injectors are arrayed in a vertical plane circumferentially about the periphery of an annular combustor. Consequently, the injectors are positioned at relatively different heights and thus have correspondingly different fluid heads associated with their positions. The fuel distribution system design therefore must also take into account the maximum fluid head existing between the uppermost and lowermost positioned injectors if acceptably uniform fuel distribution to all injectors is to be achieved. This is because without compensation for the maximum fluid head, fuel will flow primarily only through the lowest injector at low fuel flow rates, since it has the lowest fluid head loss.

The maximum fluid head represents a pressure loss which is constant from light-off power to maximum power. This fluid head pressure loss is added to the pressure losses associated with the various elements of the fuel distribution system from the fuel pump to the injector for obtaining a total pressure loss which is proportional to fuel flow rate. Since the maximum fluid head pressure loss is a constant, its relative effect compared to the total pressure is more pronounced at light-off power (low fuel flow rate) and typically negligible at maximum power (high fuel flow rate).

For example, for a gas turbine engine of about 1000 shp and including fuel injectors located in a vertical plane around a 13-inch diameter circle, the maximum fluid head pressure is about 0.4 p.s.i. Total pressure losses at light-off power are typically on the order of 10 psi and at maximum power on the order of 100 psi to 1000 psi. Accordingly, the effect of the maximum fluid head is negligible at the maximum power condition (e.g. 0.4 psi/100 psi=0.004) and fuel distribution will be uniform.

Each injector fuel line should thus incorporate sufficient pressure loss to overcome this maximum fluid head differential to ensure that the lowermost injector does not receive substantially more fuel than the uppermost injector. This problem is most pronounced at low fuel rates since this maximum fluid head differential then becomes significant relative to the fuel flow driving pressure developed by the fuel pump. Thus, it is necessary to design the fuel distribution system such that the pressure losses in the injector fuel line are sufficiently relatively high at low fuel flow rates to accommodate this differential fluid head consideration, and yet are not so great at high fuel flow rates as to require unduly high fuel pressurization to overcome the higher pressure losses. It is also important that the pressure loss in the plural injector fuel lines be substantially uniform with respect to each other over the entire engine operating range to avoid unacceptable fuel flow rate maldistribution and as low as possible for maximum fuel distribution efficiency.

Heretofore, these design considerations have been met through the utilization of rather complicated and relatively expensive flow dividing and fuel metering valves to achieve acceptably uniform fuel distribution throughout the engine operating range. Since one of these valves is incorporated in each injector fuel line and a typical gas turbine engine will utilize a plurality of fuel injectors, e.g., twelve or more, these valves represent a significant expense item particularly in the case of small gas turbine engines, i.e., less than 3000 horsepower. These valves, which may be of the mechanical or fluidic type, typically operate automatically in response to fuel pressure to impose the requisite variable impedances to fuel flow, i.e., pressure losses, in the injector fuel lines calculated to achieve acceptably uniform fuel distribution throughout the engine operating range.

Furthermore, the reliability of the flow dividing and fuel metering operations of these valves may be affected by any contaminants in the fuel. Thus, these valves typically require periodic servicing and in some instances replacement.

It is accordingly an object of the present invention to provide an improved fuel distribution system for a gas turbine engine.

Another object is to provide a fuel distribution system of the above character which avoid the need for a flow dividing and metering valve in each of the injector fuel lines.

Another object of the present invention is to provide a fuel distribution system of the above character wherein acceptably uniform fuel distribution is achieved over the entire range of engine operating conditions while reducing the energy or pressure loss in the individual injector fuel lines.

Another object is to provide a fuel distribution system of the above character wherein pressure loss in the injector fuel lines is generally equalized with respect to each other over the range of engine operating conditions from light-off to maximum power.

Another object is to provide a fuel distribution system of the above character which is relatively immune to being plugged by contaminants in the fuel.

Another object is to provide a fuel distribution system of the above character which is inexpensive to implement, efficient in operating and reliable over a long service life.

SUMMARY OF THE INVENTION

I have discovered that if a predetermined laminar fuel flow condition is established in each of the plural injector fuel lines of a fuel distribution system for a gas turbine engine combustor, an appropriate flow impedance or pressure loss versus fuel flow rate relationship can be achieved to ensure generally uniform fuel distribution not only at high fuel flow rates but, also, and more significantly, at low fuel flow rates without resorting to flow dividing and fuel metering valves. Thus, in accordance with one embodiment of the present invention, there is Provided a fuel distribution system including a distributor or manifold into which pressurized fuel is introduced.

In separate fluid communication with the distributor are a plurality of fuel lines, each leading to a different one of a plurality of fuel injectors or nozzles arrayed in a vertical plane about the periphery of the gas turbine combustor. Into each of these fuel lines is incorporated a laminar fuel flow establishing means, which, in the preferred embodiment of the invention, is simply a tube of predetermined diameter calculated to establish and sustain laminar flow of the fuel conveyed therethrough over a range of flow rates from light-off to at least approaching maximum power. Then by selecting appropriate lengths for these laminar flow tubes, the desired pressure loss versus flow rate characteristic may be established in each fuel line to ensure generally uniform fuel distribution over the entire operating range. Consequently, these laminar flow means or tubes effectively eliminate the need for the flow dividing and metering functions heretofore performed by expensive mechanical and fluidic valves.

BRIEF DESCRIPTION OF THE DRAWINGS

The novel features believed characteristic of the invention are set forth in the appended claims. The invention, in accordance with a preferred embodiment, together with further objects and advantages thereof, is more particularly described in the following detailed description taken in conjunction with the accompanying drawings in which:

FIG. 1 is a schematic diagram of a gas turbine combustor fuel distribution system constructed in accordance with one embodiment of the present invention.

FIG. 2 is an exemplary schematic graph plotting total pressure loss $\Delta P$ associated with a fuel distribution line versus fuel flow rate Q therethrough.

FIG. 3 is a schematic diagram of a fuel distribution system constructed in accordance with another embodiment of the invention.

DETAILED DESCRIPTION OF THE INVENTION

Referring to the fuel distribution system embodiment of the invention seen in FIG. 1, fuel pressurized by a suitable pump (not shown) is introduced, as indicated diagrammatically at 10, into a manifold or distributor block 12 for parallel distribution via a plurality of fuel lines, generally indicated at 14, to a corresponding plurality of conventional fuel injectors or nozzles 16 arrayed in an essentially vertical plane about the periphery of an annular combustor 18 in a gas turbine engine which is operable from light-off power to a maximum power. It will be appreciated that, in actuality, the number of fuel lines and injectors is considerably greater than the four illustrated in FIG. 1. Each fuel line includes a hose 20 and a complementary tube 22 connected end-to-end in fluid communicating relation with each other and the manifold 12 and an injector 16, respectively. Tubes 22 are preferably all of uniform length and inner diameter, and thus hoses 20, which may be conventional aircraft hose, are necessarily of varying lengths to make up the varying distances from the various injectors 16 to distributor block 12.

The fuel system includes means for establishing laminar flow of the fuel in at least a first portion, i.e. tubes 22, of each fuel line 14 during operation of the engine from a first fuel flow rate of the fuel flowable through the fuel lines 14 corresponding to the light-off power operation of the engine to a second fuel flow rate of the fuel flowable through the fuel lines 14 corresponding to the maximum power operation of the engine.

In accordance with the present invention, the diameter of tubes 22 is selected such as to establish laminar flow of the fuel being conveyed through each of the fuel lines 14. As is well known in the fluid mechanics art, fluid flow through a conduit of circular cross section, for example, is either laminar or turbulent depending on the ratio of the inertia to viscous forces acting in the fluid. This ratio, which reduces to a dimensionless number traditionally known as the Reynolds number (R), is expressed as follows:

$$R = \frac{\rho d V}{\mu} \qquad (1)$$

where $\rho$ is the fluid density, d is the conduit inner diameter, V is the mean axial fluid velocity, and $\mu$ is the fluid viscosity. For Reynolds numbers below approximately 2300, fluid flow is laminar, whereas above approximately 2300, fluid flow is turbulent.

Thus, by taking into account the density and viscosity of the fuel, including the variations in these quantities due to temperature, and the desired maximum fuel flow rate, the inner diameter, or circular flow passage, of tubes 22 is selected such that the Reynolds number does not exceed 2300 over a range of engine operating conditions from light-off to maximum power, or at least approaching maximum power. These laminar flow tubes 22 should have a reasonably smooth bore to ensure laminar flow and may be in the form of drawn tubing of a suitable metal such as stainless steel or INCO 625 or of a suitable plastic such as Teflon. The inner flow diameter of the hoses 20, i.e. second portion of the fuel line 14, is selected to be of a sufficiently large dimension, e.g., four or more times larger than the inner flow diameter (d) of the laminar flow tubes 22, to impose negligible pressure loss on fuel flow therethrough even at maximum fuel flow rates.

According to the Hagen-Poiseuille formula, pressure loss ($\Delta P$) in a laminar flow tube is expressed as follows:

$$\Delta P = \frac{128 \, \mu \, l Q}{\pi \, d^4} \qquad (2)$$

where $\mu$ is the fluid viscosity, l is the tube length, Q is the fluid flow rate, and d is the tube inner diameter. From this formula it is seen that pressure loss is directly proportional to tube length and to flow rate. Thus, having selected the requisite tube inner diameter for laminar flow, it remains to select the preferably uniform length for laminar flow tubes 22 calculated to establish an equivalent relationship between pressure loss and fuel flow rate in each fuel line 14 for performing the flow dividing and fuel metering functions requisite to achieving generally uniform fuel distribution to the various injectors 16 over the entire range from light-off to maximum power as described further hereinbelow.

The primary benefit gained from using laminar flow tubes 22 is that, as noted above, pressure loss under laminar flow conditions is directly proportional to flow rate to the first power, whereas, as is well known in the fluid mechanics art, under turbulent flow conditions, pressure loss is directly proportional to flow rate to the second power, i.e., squared. From this it can be seen that, under laminar flow conditions, large variations in fuel flow can be accommodated with smaller variations in pressure loss as compared to turbulent flow. That is, by virtue of the linear relationship between pressure loss and flow rate under laminar flow conditions, a given increase in pressure loss will support a directly proportionate increase in fuel flow. Consequently, less burden is imposed on the fuel pump to increase power (fuel flow rate), which becomes a significant benefit as gas turbine engines age. Moreover, this feature has the potential of enabling the maximum power of an engine to be increased to a limited extent without having to replace an existing fuel pump.

It is appreciated that the fluid head of each fuel injector 16 is the static fluid pressure of a fluid column of a height equal to the elevation of each injector 16 relative to common reference. Thus, the maximum fluid head differential that must be overcome to avoid undesirable fuel maldistribution is the difference in elevation between the uppermost, or first, fuel injector 16a at maximum elevation and the lowermost, or second, fuel injector 16b at minimum elevation.

In tailoring a fuel distribution system to a particular gas turbine engine there are two principal design points on the requisite pressure loss ($\Delta P$) versus fuel flow rate (Q) operating curve that must be satisfied as illustrated in FIG. 2 with respect to a fuel distributing line. One is a high fuel flow rate design point H which corresponds to an upper limit of total pressure loss $\Delta P$ max that the fuel pump must be capable of overcoming to provide fuel to each injector 16 at a predetermined flow rate $Q_{max}$ at maximum power. The other is a low fuel flow rate design point L corresponding to a minimum pressure loss $\Delta P$ min and minimum flow rate $Q_{min}$ at light-off, which $\Delta P$ min is nevertheless sufficient to avoid unacceptable fuel maldistribution at low power engine operating conditions, e.g., light-off and idle.

By virtue of the laminar fuel flow conditions imposed in each fuel line 14 by laminar flow tubes 22, a laminar flow operating curve 28 can be readily made to intersect these high and low design points since it is a straight line (pressure loss being proportional to flow rate to the first power). Absent these laminar flow tubes, the turbulent fuel flow conditions imposed by the fuel injectors 16 and any trim orifices incorporated in the fuel lines would result in an exponential operating curve 30 since, with turbulent flow, pressure loss is proportional to fuel flow rate to the second power. If this exponential operating curve is made to satisfy the high design point H, the pressure losses produced by all fuel flow rates below this design Point are consistently less than the pressure losses produced by correspondingly lower fuel flow rates under laminar flow conditions (flow rate proportional to square root of pressure loss for turbulent flow versus flow rate proportional to pressure loss for laminar flow).

It is thus seen that at low fuel flow rates there is insufficient pressure loss under turbulent fuel flow conditions to accommodate the maximum fluid head differential between the uppermost and lowermost fuel injectors 16, and consequently fuel flow dividing and metering valves are required to avoid unacceptable fuel maldistribution therebetween by controllably imposing the requisite increased pressure loss.

More specifically, as discussed above with respect to the exemplary 1000 shp engine the maximum fluid head pressure is about 0.4 psi and the predetermined acceptable level of fuel maldistribution or nonuniformity between the injectors 16 is less than about 20%. This requires a $\Delta P$ min of at least 2.0 psi at light-off for a laminar flow system, since fuel flow rate is linear with respect to $\Delta P$. A laminar flow fuel distribution system in accordance with the invention can be utilized, resulting in the laminar flow curve 28, which meets the requirements of the low and high design points L and H. Although the fuel injectors 16 have a maldistribution of about 20% at the low design point L, the maldistribution decreases at high flow rates Q because the ratio of the constant maximum head loss (e.g. 0.4 psi) to the increasing total $\Delta P$ decreases. For example, at an exemplary $\Delta P$ max of 700 psi for the 1000 shp engine, the ratio 0.4/700 results in negligible maldistribution at the high design point H.

In contrast, a turbulent fuel delivery system, represented by the curve 30 required to operate at the high design point H, has a substantially lower $\Delta P$ value at the required $Q_{min}$ value associated with the low design point L. Accordingly, the fuel maldistribution at the required light-off $Q_{min}$ value for a turbulent fuel system (curve 30) which also meets the high design point H would be unacceptably greater than the predetermined allowable maldistribution value associated with the low design point L.

To, therefore, utilize a turbulent fuel delivery system typically requires conventional complex valving to increase the pressure loss in the fuel injectors 16 to a value at least as great as the $\Delta P$ min value at the low design point L to accommodate the maximum head loss at light-off for obtaining acceptable fuel maldistribution of less than about the exemplary 20% value. The valves would open at a predetermined flow rate value greater than $Q_{min}$ to reduce the added pressure loss which is neither required nor desirable at high flow rates where the maximum head loss is relatively small.

In contrast, the laminar flow tubes 22 Provide the requisite pressure loss in and of themselves due to the linearity of the curve 28 over the desired operating range, and thus their incorporation in each fuel line is an eminently practical solution to this problem of fuel maldistribution at low fuel flow rates, which obviates the need for complex valving.

Inasmuch as the maximum fluid head pressure loss is negligible at high fuel flow rates, then in order to obtain substantially uniform fuel flow distribution from the injectors 16 at high fuel flow rates, it is desirable that all the fuel lines 14, including the laminar tubes 22, have equivalent pressure loss versus fuel flow rate characteristics. Since, in one embodiment of the invention, the hoses 20 are sized to have negligible pressure losses, the laminar tubes 22 then should meet this requirement. For example, all of the laminar tubes 22 should, in such a Preferred embodiment, have $\Delta P$, Q curves equivalent or equal to the curve 28 illustrated in FIG. 2. This may be simply accomplished by having all tubes 22 identical, including equal inner diameters and equal lengths. Equation (1) is used to select the value of d for the tubes 22 at the high design point H to ensure laminar flow up to $Q_{max}$. Equation (2) is then used to select the value of 1 for the tubes 22 at the low design point L for obtaining the predetermined $\Delta P$ min. Accordingly, the tubes 22 are thus sized for obtaining laminar flow at light-off and up to and including the maximum power fuel flow rates and while meeting the desired maldistribution value at light-off.

For certain engine applications it may become necessary to resort to some tailoring of the pressure loss versus fuel flow rate relationship in order to achieve generally uniform fuel distribution to the various injectors while adhering to a predetermined fuel pressure to output fuel flow and power schedule. To this end, it is contemplated that each fuel line 14 may incorporate at least one trim orifice, which is illustrated at 24 in FIG. 1, as being positioned at or immediately adjacent to the entry into each fuel line 14 from distributor block 12. If an additional trim orifice is called for, it may be incorporated in each laminar flow tube 22, as indicated in one instance at 26. It will be appreciated that the presence of trim orifice 26 will create a localized turbulent flow condition; however, laminar flow is restored several tube diameters' distance downstream therefrom. These illustrated locations of the trim orifices in the fuel lines are illustrative only, as their positions are not critical. Their only significance is the contribution of their pressure loss characteristics to that of the laminar flow tubes in tailoring a fuel flow curve to meet a particular application.

FIG. 3 illustrates another embodiment of the invention wherein each fuel line leading from distributor block 12 to the individual injectors 16 is constituted entirely by a laminar flow tube 28. For the reasons indicated above, each tube is preferably of the same length. The prescribed tube length is determined by the distance between the distributor block and the most remotely positioned injector plus any additional length necessary to establish the desired pressure loss characteristic. The illustrated dash-line portions of the laminar flow tubes leading to less remote injectors are intended to indicate circuitous routings thereof in order to make up this prescribed length. Obviously, these circuitous routings should be accomplished with rather gentle bends so as not to significantly disturb the laminar flow of fuel therethrough.

In addition to the benefits and advantages of the invention noted above, it is found that the inner diameter of the laminar flow tubes can be quite large, e.g. 0.04 inches, as compared to any trim orifices included in the fuel lines having inner diameters not smaller than 0.021 inches, and consequently these tubes are virtually immune to being plugged by any contaminants in the fuel. For this reason, it is advantageous to avoid using trim orifices if at all possible.

While the invention has been disclosed in the context of the laminar flow element incorporated in each fuel line being in the form of a tube, it should be understood that this element may take other forms and still provide the desired pressure loss versus flow rate relationship. One such alternative form is a porous media such as a sintered metal block. However, porous media suffers from the obvious drawback of being readily plugged by contaminants in the fuel.

It is seen that the present invention provides a fuel distribution system which is eminently simple in construction and reliable in its operation of uniformly distributing fuel to a plurality of fuel injectors over a wide range of fuel flow rates in an efficient and practical manner. Thus, the objects set forth above, including those made apparent from the preceding description, are efficiently attained and, since certain changes may be made in the disclosed embodiments without departing from the scope of the invention, it is intended that all matter contained in the above description and disclosed in the accompanying drawing shall be interpreted as illustrative and not in a limiting sense.

Having described the invention, what is claimed as new and desired to secure by Letters Patent is:

1. A fuel distribution system for a gas turbine engine, said system comprising, in combination:
   a distributor for receiving pressurized fuel;
   a plurality of fuel injectors;
   a corresponding plurality of fuel lines, each said fuel line connecting a different one of said fuel injectors in parallel fluid communicating relation with said distributor; and
   means incorporated in each said fuel line for establishing laminar flow of fuel therethrough from light-off to maximum power of said engine.

2. The fuel distribution system defined in claim 1, wherein at least some of said injectors are stationed at relatively different fluid head Positions, and wherein each said laminar flow establishing means is in the form of a laminar fuel flow establishing element, said elements introducing pressure losses in said fuel lines so that the differences in fluid heads of said injectors at low fuel flow rates relative to pressure of said fuel are sufficiently low to ensure generally uniform fuel flow distribution through said fuel lines.

3. The fuel distribution system defined in claim 2, wherein said laminar flow elements have equivalent pressure loss versus fuel flow rate characteristics.

4. The fuel distribution system defined in claim 2, wherein each said laminar flow element is in the form of a laminar flow tube of circular cross section.

5. The fuel distribution system defined in claim 4, wherein said laminar flow tubes are all of equal inner diameter and length.

6. The fuel distribution system defined in claim 4, wherein each said fuel line includes one of said laminar flow tubes and a hose connected in end-to-end fluid-coupled relation, said hoses being of a larger inner diameter than inner diameters of said laminar flow tubes.

7. The fuel distribution system defined in claim 6, wherein said laminar flow tubes are all of equal length and inner diameter.

8. The fuel distribution system defined in claim 5, which further includes at least one trim orifice incorporated in each said fuel line.

9. The fuel distribution system defined in claim 5, wherein each said fuel line is constituted entirely by one of said laminar flow tubes.

10. A fuel distribution system for a gas turbine engine operable from light-off to maximum power comprising:
   a manifold for receiving pressurized fuel;
   a plurality of fuel injectors;
   a plurality of fuel lines, each of said fuel lines being connected in fluid communication with said manifold and a respective one of said fuel injectors; and
   means for establishing laminar flow of said fuel in at least a first portion of each of said fuel lines from a first fuel flow rate of said fuel flowable in said fuel lines corresponding to said light-off power to a second fuel flow rate of said fuel flowable in said fuel lines corresponding to said maximum power.

11. A fuel distribution system according to claim 10 wherein said first portion comprises a laminar flow tube.

12. A fuel distribution system according to claim 11 wherein said laminar flow tube has a circular flow passage.

13. A fuel distribution system according to claim 12 wherein all said laminar flow tubes have equal inner diameters and equal lengths.

14. A fuel distribution system according to claim 10 wherein each of said fuel lines includes a second portion being complementary to said first portion, said second portion sized for obtaining pressure losses therethrough which are negligible relative to pressure losses in said first portions at said second fuel flow rate.

15. A fuel distribution system according to claim 14 wherein said first portion comprises a tube having an inner flow diameter and said second portion comprises a hose having an inner flow diameter which is at least four times greater than said first portion inner flow diameter.

16. A fuel distribution system according to claim 10 wherein said fuel line first portions have equivalent pressure loss versus flow rate characteristics.

17. A fuel distribution system according to claim 10 wherein:
said fuel injectors include a first fuel injector disposed at a maximum elevation and a second fuel injector disposed at a minimum elevation operable with a fluid head differential therebetween due thereto, and
said laminar flow means is effective for obtaining pressure losses in said fuel lines at said first fuel flow rate relative to which said fluid head differential is sufficiently low to ensure generally uniform fuel flow distribution through said injectors at both said first and second fuel rates.

18. A fuel distribution system according to claim 17 wherein said fluid head differential is less than about twenty percent of pressure loss in each of said fuel lines.

19. A fuel distribution system according to claim 17 wherein said fuel line first portions comprise laminar flow tubes.

20. A fuel distribution system according to claim 19 wherein said laminar flow tubes comprise circular flow passages having inner diameters, and said flow tubes have equal inner diameters and equal lengths.

21. A fuel distribution system according to claim 17 further including at least one trim orifice disposed in each of said fuel lines.

22. A fuel distribution system according to claim 17 wherein said laminar flow means is effective for establishing laminar flow throughout said fuel lines at both said first and second fuel flow rates.

* * * * *